United States Patent [19]
Tynan

[11] Patent Number: 5,635,589
[45] Date of Patent: Jun. 3, 1997

[54] PROCESS FOR PRODUCTION OF CONDENSATION POLYMERS

[75] Inventor: Daniel G. Tynan, Wilmington, Del.

[73] Assignee: E. I. Du Pont de Nemours and Company, Wilmington, Del.

[21] Appl. No.: 657,746

[22] Filed: May 31, 1996

Related U.S. Application Data

[63] Continuation-in-part of Ser. No. 399,283, Mar. 6, 1995.
[51] Int. Cl.[6] .................................................. C08F 6/00
[52] U.S. Cl. .................. 528/483; 528/308.1; 528/308.3; 528/308.5; 528/481; 528/483; 528/491; 528/492; 528/503
[58] Field of Search .......................... 528/308.1, 308.3, 528/308.5, 481, 483, 491, 492, 503

[56] References Cited

U.S. PATENT DOCUMENTS

| | | | |
|---|---|---|---|
| 2,973,341 | 2/1961 | Hippe et al. | 526/65 |
| 3,110,547 | 11/1963 | Emmert | 264/211.17 |
| 3,390,135 | 6/1968 | Seiner | 526/64 |
| 3,469,618 | 9/1969 | Siclari et al. | 159/48.2 |
| 3,545,520 | 12/1970 | Siclari et al. | 159/4.04 |
| 3,594,356 | 7/1971 | Hinton | 528/483 |
| 4,590,259 | 5/1986 | Kosky et al. | 528/272 |
| 4,612,363 | 9/1986 | Sasaki et al. | 528/274 |
| 4,835,293 | 5/1989 | Bhatia | 549/274 |
| 5,434,239 | 7/1995 | Bhatia | 528/274 |

FOREIGN PATENT DOCUMENTS

| | | |
|---|---|---|
| 2008068 | 1/1970 | France . |
| 2389649 | 12/1978 | France . |
| 46692 | 6/1966 | Germany . |
| 2118565 | 11/1983 | United Kingdom . |

OTHER PUBLICATIONS

J. McKetta, Encyclopedia of Chemical Processing and Design, Marcel Dekker, Inc., New York, 40, 156, 1992.

Encyclopedia of Polymer Science and Engineering, 2nd Ed., John Wiley & Sons, New York, vol. 12, p. 30, 1990.

Primary Examiner—Samuel A. Acquah

[57] ABSTRACT

Disclosed is a process for increasing the molecular weight of condensation polymers involving the use of a high velocity rarefied inert gas sweep in the polymer finishing process.

8 Claims, 3 Drawing Sheets

PROCESS FOR PRODUCTION OF CONDENSATION POLYMERS

This is a continuation-in-part of co-pending Ser. No. 08/399,283, filed on Mar. 6, 1995.

FIELD OF THE INVENTION

The present invention pertains to a process for production of condensation polymers of high molecular weight. More particularly, the present invention pertains to a process for finishing (increasing the molecular weight of) poly(ethylene terephthalate) pre-polymer involving the use of a high velocity rarefied inert gas sweep.

BACKGROUND OF THE INVENTION

Condensation polymers, primarily polyesters and polyamides, are produced in very large volumes. There is considerable incentive to increase the utilization of already existing production equipment and to provide new equipment incorporating higher efficiency processes. One method long known for improving utilization is to increase the conversion rate to high molecular weight finished product from lower molecular weight prepolymer in the so-called finishing step typical of many commercial condensation polymer production facilities.

The polycondensation reactions which result in the formation of high molecular weight polymer are equilibrium reactions. Thus, in order to drive the reaction to higher molecular weight, it is desirable to quickly remove the volatile reaction products which participate in the reverse (depolymerization) reactions. It has long been known in the art to accomplish this removal by the application of vacuum, see, for example, the *Encyclopedia of Chemical Processing and Design*, J. McKetta, ed., vol. 40, P. 156, Marcel Dekker, Inc., New York, 1992, or in the alternative, by the application of an inert gas purge to the finisher, see, for example, the *Encyclopedia of Polymer Science and Engineering*, 2nd ed., vol 12, p. 30, John Wiley & Sons, New York, 1990.

Further known in the art, and taught in the references hereinabove cited, is the desirability to maximize surface to volume ratio of the polymer during the finishing process, which is preferably accomplished in a melt-film forming apparatus such as is described in the parent case hereof. Since in many commercial scale operations, the rate of reaction is known to be mass-transfer limited, continuous renewal of the melt surface by melt agitation or mixing is of great importance.

Bhatia, U.S. Pat. No. 5,434,239, discloses a process for production of high molecular weight polyester in which application of an inert gas sweep with a high gas velocity at atmospheric pressure to an agitated melt in a melt-film forming apparatus enhances conversion rate of polyesters to high molecular weight over lower gas velocities or vacuum.

Sasaki et al. (U.S. Pat. No. 4,612,363) discloses a process whereby high volumetric flow rates of inert gas applied to a very thin non-agitated melt film induces very high rates of polymerization in the production of high molecular weight polyesters.

However, it has long been recognized in the art (Kemnitz et al., GD R46 692) that the application of large volumes of gas to an agitated melt is limited and complicated by excessive disruption of and entrainment of the melt, with resulting problems of process control and product quality. Thus, for example, the process of Sasaki et al. is limited to non-agitated and very thin films, and would not be suitable for use in a melt film finishing device providing an agitated melt.

Hussein (GB 2,118,565A) discloses a solid phase polymerization process utilizing a purge of air or inert gas at atmospheric or reduced pressure to achieve modest conversion rates of polyesters. No particular combination is said to be preferred; indeed Hussein suggests that all configurations are equivalent in effectiveness.

SUMMARY OF THE INVENTION

A process is provided for achieving rapid conversion of low molecular weight condensation polymers or prepolymers, preferably polyesters, to high molecular weight polymers, the process comprising application to a continuously renewed condensation polymer melt film surface of an inert gas sweep, the inert gas pressure being in the range of 1 torr to 100 torr and the velocity of the inert gas being in the range of 10 to 100 ft./sec. Specifically, the invention concerns a process for increasing the molecular weight of condensation polymers, the process comprising:

introducing a low molecular weight starting material to a heated reactor vessel, the vessel being equipped with a means for stirring the material, the vessel being further equipped with a means for introducing an inert gas, the vessel being further equipped with a means for removing the inert gas, the vessel being further equipped with a means for applying vacuum to the material while it is being stirred;

heating the vessel either before, during, or after the introduction of the material, to a temperature at which a polycondensation reaction will proceed;

stirring the material during the polycondensation reaction;

during the polycondensation reaction, causing an inert gas to flow through the vessel over the surface of the material, the inert gas being at a pressure of no greater than 100 torr, preferably, 1 torr to 100 torr, and the rate of flow of the inert gas being from 10 to 100 ft./sec.; and removing the material when the molecular weight has undergone a desired increase.

DETAILED DESCRIPTION OF THE INVENTION

Figure 1:
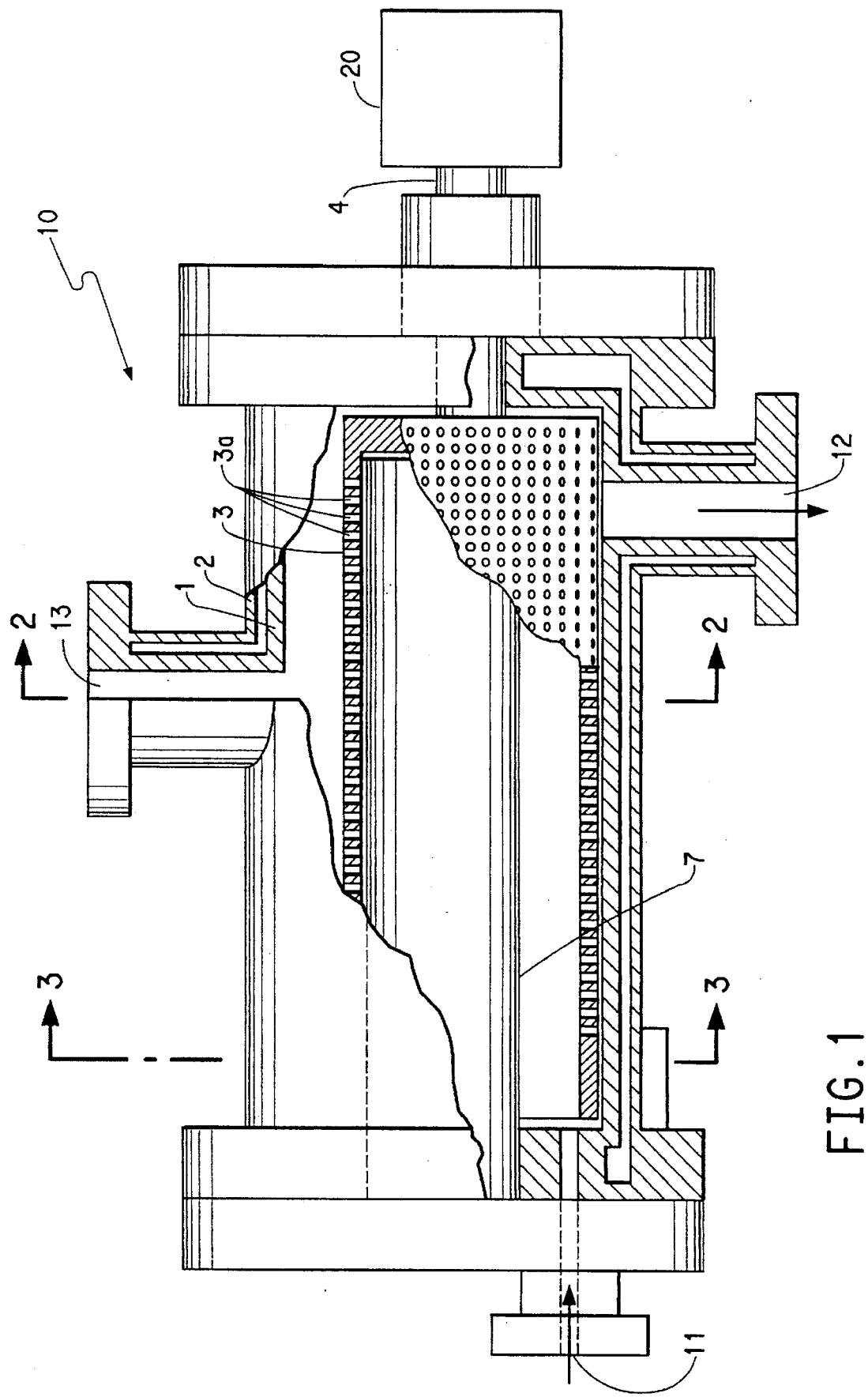
FIG. 1 is a side, partially sectional view of an exemplary embodiment of the invention which can be used, according to the present invention, as a continuous processor, polymerizer, or finisher.

The process of this invention is based upon the fundamental discovery that inert gas at a pressure in the range of 1 torr to 100 torr flowed over the surface of a molten condensation polymer at a rate of greater than 10 ft./sec. but not more than 100 ft./sec., preferably not more than 50 ft./sec., is surprisingly and unusually effective at removing the volatile species produced in a polycondensation polymerization thus enhancing the conversion rate to high molecular weight polymer.

It has been known in the art that inert gas flows were effective at increasing conversion rate, and some suggestion that higher rates were more effective. However, the known art focusses on inert gas flows conducted at or close to atmospheric pressure where high volumetric flow rates and high gas velocities correspond to high mass flow rates, which at high enough levels have been found to cause disruption of the melt surface with concomitant entrainment of melt into the flowing gas and inhomogeneous polymerization. Until now, no satisfactory means has been identified for achieving very high conversion rates available from high gas flow rates in melt mixers suitable for commercial scale operations. It has been found, surprisingly, that the process of this invention overcomes the limitations inherent in the processes of the former art.

It is particularly surprising that high conversion rates are obtained by employing gas velocities of 10 ft/sec. or more at reduced pressures without concomitant entrainment of the melt which such high flow rates would cause if employed at atmospheric pressure.

The present invention may be practiced for the purpose of producing any condensation polymer, including polyesters and polyamides, and may be practiced in solid phase as well as melt phase polymerizations. While there is no particular limitation on the degree of polymerization of the starting material, the process of this invention is best suited to be a polymerization finishing step in which a low molecular weight prepolymer is converted to high molecular weight finished product. It is preferred to employ the process of this invention to production of polyesters with production of poly(ethylene terephthalate) most preferred. Preferably the process is conducted with the polymer completely in the melt phase. Most preferably, the process is a continuous process conducted in an apparatus in which the melt is continuously mixed and formed into molten films, the surfaces whereof are continuously refreshed.

The rarefied inert gas may be introduced by any convenient means. It has been found satisfactory in the practice of this invention to apply a vacuum of ca. 1 torr to the finishing apparatus, followed by bleeding an inert gas into the vacuum until the total pressure reaches some target level determined by the displacement of the vacuum pump, the free space volume of the apparatus, the surface area of the melt, and the rate at which that surface is being replenished. The target operating pressure may be determined by directly measuring the gas velocity at the surface of the melt by using an anemometer. However, in practice such a procedure would be difficult or impossible. An alterative procedure, and the one followed in the specific embodiments hereinbelow described, is to calculate the volumetric flow rate required to achieve the targeted gas velocity in an apparatus of a given cross-sectional area. Many commercial vacuum pumps are supplied with information relating the volumetric displacement of the pump to the pressure. The necessary operating pressure may be determined therefrom. It is often convenient to employ some average value for the cross-section of a geometrically complicated apparatus.

The process of this invention may be carried out in virtually any polycondensation process which admits of the application of vacuum and gas flow. The process of this invention is, however, particularly well-suited to use in a continuous melt film finisher. Numerous designs of continuous melt film finishers are known in the art. Some are equipped with paddles, some with screws, some equipped for wiping the walls of the vessel and so on. Typical of continuous melt film finishers known in the art are those of Albrecht et al. (BDR AS1645,630), Vodonik (U.S. Pat. No. 2,758,915) and Latinen (U.S. Pat. No. 3,031,273).

A particularly suitable apparatus for the practice of this invention, the subject of the application co-pending herewith, comprises:

(a) a housing having at least one inlet whereby unprocessed or unreacted liquid is fed into the apparatus;

(b) a rotating perforated drum located within the housing;

(c) exterior to the rotating perforated drum and in cooperation therewith, an outside relatively stationary body capable of tangential contact with the curved outer surface of the rotating perforated drum, which tangential contact is elongated in the axial direction of the rotating perforated drum, thereby forming, outside the rotating perforated drum and in proximity to said tangential contact, at least one outer nip region between the curved outer surface of the rotating perforated drum and the inward surface of the outside relatively stationary body, which outer nip region converges, when viewed in radial cross-section with respect to the rotating perforated drum, to a point of tangential contact, whereby liquid material accumulating within the outer nip region is forced through perforations into the inside of the rotating perforated drum, thereby forming a liquid film on that inside surface of the drum which is opposite to that outside surface of the drum adjacent to the outer nip zone;

(d) interior to the rotating perforated drum, an inner relatively stationary body positioned within the rotating perforated drum, a convexly curved outer surface of the inner relatively stationary means capable of tangential contact with the concavely curved inner surface of the rotating perforated drum, which tangential contact is elongated in the axial direction of the rotating perforated drum, thereby forming, inside the rotating perforated drum and in proximity to said tangential contact, at least one inner nip region between the curved outer surface of the inner relatively stationary body and the curved inner surface of the rotating perforated drum, which inner nip region converges, when viewed in radial cross-section with respect to the rotating perforated drum, to a point of tangential contact, whereby liquid material accumulating within the inner nip region is forced though said perforations and out of the rotating perforated drum, thereby forming a liquid film on an outside surface of the drum which is opposite to the inside drum surface adjacent the inner nip zone;

whereby the points of tangential contact, in cross-section with respect to the rotating perforated drum, and therefore also the inner and outer nip regions formed thereby, are spaced along the circumference of the rotary perforated drum, and the liquid material being processed, until being withdrawn from the apparatus, can repeatedly move between the outer nip region and the inner nip region, such that the nip regions or zones cause agitation of the fluid being processed and repeatedly generate new fluid surfaces.

The apparatus further comprises one or more ports, in communication with the space between the rotating perforated drum and the housing, for the removal of volatile constituents. For continuous operation, the apparatus may include an exit port for the the removal of product such that the liquid material being processed, until being withdrawn from the apparatus, can repeatedly move between at least one outer nip region and at least one inner nip region as the material being processed progresses in the axial direction of the rotating perforated drum from the inlet port to the exit port. The apparatus may have additional ports in the housing for permitting an inert or otherwise non-reactive gas under pressure, such as nitrogen, to enter the housing so as to sweep volatile constituents or volatile by-products away from the surface of the fluid.

In one embodiment of the above apparatus, the housing may be substantially cylindrical, although square, ovoid, rectangular, or other shapes may be employed, as will be readily appreciated by the skilled artisan.

Referring now to FIG. 1, number 10 generally denotes a processing apparatus, which may be employed as a mixer, liquid-gas separator, reactor, polymerizer, finisher, or the like, in accordance with one embodiment of the present invention. The apparatus, as illustrated, is configured so as to be operated in a continuous mode, but the apparatus could also be constructed, retaining key features, to operate in a batch mode.

Apparatus 10 comprises a generally cylindrical housing 1 which, as illustrated, includes a heating jacket 2. Other shapes for the housing are possible, as, for example, described below. Eccentrically positioned within the housing is a rotating drum 3 containing a plurality of perforations 3a and mounted on a drive shaft 4 connected to a drive means 20. In other embodiments, however, as exemplified below, the rotating drum is not eccentrically positioned in the housing.

Figure 2:
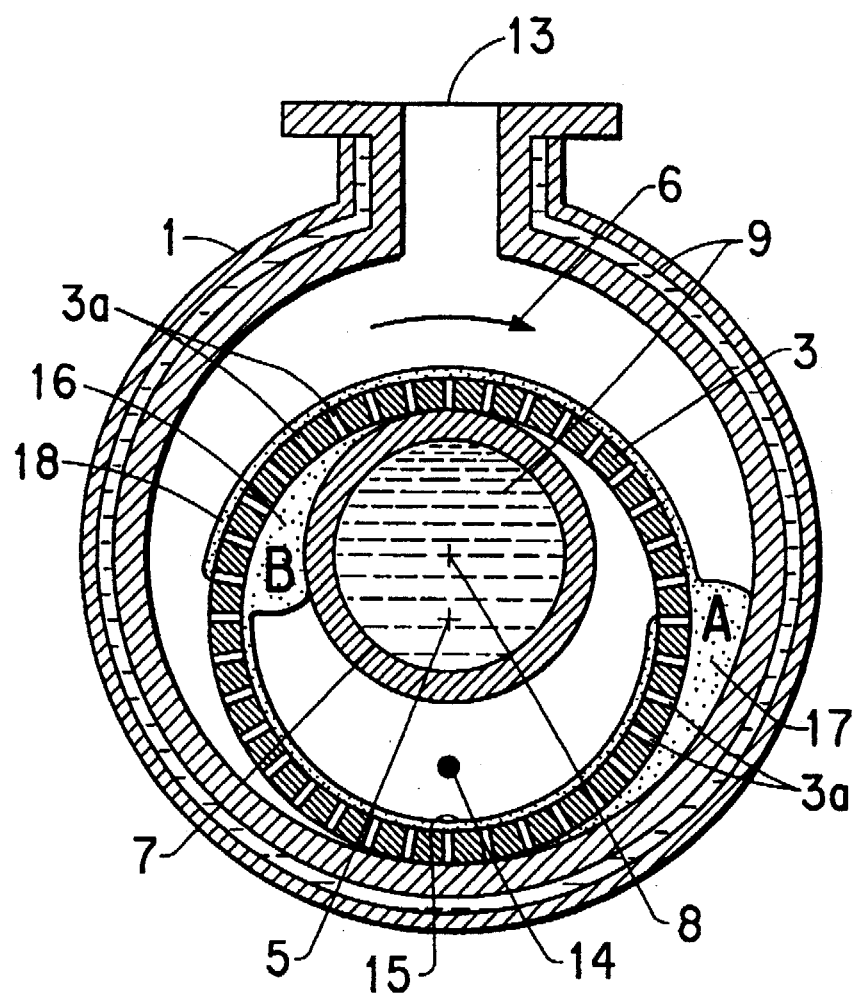
FIG. 2 is a sectional view of the apparatus illustrated in FIG. 1 taken along the line 2—2 showing a liquid being processed.

Referring now to FIG. 2, the axis of rotation for the rotating drum is shown at 5 and the direction of rotation is shown by arrow 6. Positioned within the rotating perforated drum is a non-rotating stator drum 7, the center 8 of which coincides with the center of the cylindrical housing. The surface of the non-rotating stator drum is preferably smooth, although shallow indentations, profilings, or grooves are possible to enhance mixing or affect the movement of the fluid being processed. The outer rotating perforated drum 3, in this embodiment, is mounted eccentrically relative to the inner non-rotating stator drum 7. The inner surface of the rotating perforated drum is tangent to the outer surface of the stator drum.

The outer surface of the perforated drum, in turn, is tangent to the inner surface of the cylindrical housing 1. The stator drum 7 may be heated, as shown in FIG. 2, by an internal heating media 9, such as hot oil.

Returning now to FIG. 1, the apparatus 10 has an inlet 11 where fluid material to be processed is fed to the apparatus and an outlet 12 where fluid material which has been processed may exit the apparatus. The apparatus 10 is further equipped with a port 13 through which any volatile constituents removed from the fluid material may exit the apparatus 10. To assist in the removal of any volatile materials, a vacuum may be applied to the port. Alternatively, a gas under pressure, such as nitrogen, may be added to the system through a second port (not shown) to sweep the volatile materials away from the surface of the fluid being processed in order to allow these materials to exit through the port 13.

In operation, as illustrated in FIGS. 1 and 2, fluid material from inlet 11 enters the processor in the space between the inner surface of the perforated drum 3 and the outer surface of the stator drum 7, the entrance point denoted as 14 in FIG. 2. Alternative or additional entrance points, however, are also contemplated herein.

Referring to FIG. 2, the fluid material within the processor, due to viscous drag, is carried as a film 15 on the inner surface of the rotating drum into a kind of liquid wedge "B", a first (or inner) nip zone or region, which is formed where the concavely curved inner rotating surface approaches the convexly curved surface of the stator drum. The fluid material 16 in the first nip zone is thereby squeezed between the outer surface of the stator drum 7 and the inner surface of the rotating perforated drum 3. Hydrodynamic forces drive the fluid through the rotating drum's perforations 3a, located near wedge "B", to the outside of the rotating drum 3, thereby forming a film or layer 18 on the outer surface of the rotating perforated drum. Viscous drag again carries the fluid material in film 18 on the outer surface of the rotating perforated drum, this time into a kind of fluid wedge "A", a second or outer nip zone or region. The fluid material 17 therein is now squeezed between the outer surface of the rotating perforating drum 3 and the inner curved surface of the cylindrical housing 1 which like the stator drum 7 is stationary. Hydrodynamic forces drive the fluid material through perforation 3a located near wedge "A" of the rotating drum, back into the rotating drum, thereby forming a film on the inner surface of the rotating drum.

As the processor continues to operate, any volatile materials can escape from the fluid material being processed. The forcing of a fluid material to and fro through the two nip zones generates large surface areas in the form of thin films on the surfaces of the drums within the apparatus.

Accordingly, the apparatus of this invention maintains a high fluid surface to volume ratio and regenerates the fluid surface frequently. When operating in continuous mode, processed fluid material can be conveyed towards outlet 12 by gravity or other means, as shown in FIG. 1. Any volatile constituents may exit through the port 13 assisted by vacuum or by gas pressure.

The apparatus can be operated in many different ways and adjusted within wide limits, depending on the particular application. For example, the speed of rotation of the driven parts can be adjusted such that the apparatus can be adapted, in an optimum manner, to the particular material being processed. Thus, the degree of mixing, reacting, etc., as well as the throughputs, can be varied as required.

Among its uses, the apparatus of this invention can be used to process any fluid material in need of devolatization. The apparatus is especially well suited for processing thermoplastic polymeric materials, for example polyesters such as polyethylene terephthalate and copolymers thereof. The apparatus can also be used as a finisher in a melt polymerization process in order to raise, in a limited period of time, the degree of polymerization of the melt.

A processor according to this invention can also be used as a reactor for many chemical processes, wherein a first fluid reactant is fed through inlet 11 and a second fluid reactant is fed through port 13 or through an additional port (not shown), optionally under pressure in the case of a gaseous reactant. The present invention, by generating an increased surface area for the contacting of reactants, aids in furthering their chemical reaction.

The invention is further illustrated by the following specific embodiments.

COMPARATIVE EXAMPLE 1

A prepolymer feed material was formed by the esterification of terephthalic acid and ethylene glycol followed by a polycondensation reaction facilitated by the catalyst antimony trioxide (Sb2O3). The prepolymer had an intrinsic viscosity of 0.285 dl/gm, a degree of polymerization of 25.33, a carboxyl ends content of 27.1 $Eq/10^6$ gms, an antimony content of 241 to 245 ppm, and a diethylene glycol content of 1.07% to 1.10%.

In lieu of a separate inlet, a feed hopper was placed at the port of an apparatus configured similarly to the apparatus shown in FIG. 2. The rotating perforated drum had an outer diameter of 3.792 inches, an inner diameter of 3.077 inches, 8 rows of holes with 48 holes per row, for a total number of holes of 384. Each hole or perforation is 0.062 (1/16th) inches in diameter. The stator has a diameter of 2.312 inches and the distance between the axial centers of the stator body and the rotating drum is 0.375 inches.

The granular feed material was dried overnight at 120° C. in a vacuum. With the rotor drum stopped, a portion of a 42 gram charge of feed material was added under nitrogen at atmospheric pressure through the hopper to the processor which was preheated to 280° C., and set up to be run in batch, rather than continuous, mode. The feed material introduced into the processor was given time to melt. The rotor was then run at 20 rpm for a short time to confirm, based on the torque read-out, that the feed material was melted. The rotor was then stopped, another portion of the 42 g charge of feed material was added and given time to melt, the rotor again run at 20 rpm, etc., until the full charge of feed material was in the reactor and melted. A vacuum of approximately 0.5 mm Hg (absolute) was then applied to the processor. The rotor speed was then set at 30 rpm. The processor was allowed to run for 20 minutes, after which time water was circulated through cooling passages in the housing of the processor to quench the molten processed material. Products of condensation (e.g., glycol, diethylene glycol, and water) were collected in a cold trap connected to the evacuated processor.

Polymeric product was collected from the processor and analyzed. The product was white and appeared to be free of color impurities based on visual inspection. The intrinsic viscosity (IV) of the product was determined to be 0.415 dl/gm corresponding to a degree of polymerization of 43.61 units.

COMPARATIVE EXAMPLE 2

The prepolymer feed material of Comparative Example 1 was dried as therein described and fed to the apparatus of Comparative Example 1, which in this case had been pre-heated to 290° C.

With the rotor drum stopped, a portion of a 55 gram charge of feed material was added through the hopper to the processor, under nitrogen at atmospheric pressure. The feed material introduced into the processor was given time to melt. The rotor was then run at 20 rpm for a short time to confirm, based on the torque read-out, that the feed material was melted. The rotor was then stopped, another portion of the 55 g charge of feed material was added and given time to melt, the rotor again run at 20 rpm, etc., until the full charge of feed material was in the reactor and melted. Nitrogen gas was flowed through the vessel at ca. 760 torr, at a flow rate of 0.13 scfm giving a calculated average gas velocity of 0.068 ft/sec. The rotor speed was then set at 60 rpm. The processor was allowed to run for 30 minutes, after which time water was circulated through cooling passages in the housing of the processor to quench the molten processed material. Products of condensation (e.g., glycol, diethylene glycol, and water) were collected in a cold trap connected to the evacuated processor.

Polymeric product was collected from the processor and analyzed. The product was white and appeared to be free of color impurities based on visual inspection. The intrinsic viscosity of the product was determined to be 0.4966 dl/gm corresponding to a degree of polymerization of 56.53 units.

EXAMPLE 1

The prepolymer feed material of Comparative Example 2 was dried as therein described and fed in the same manner as in Comparative Example 2 to the apparatus of Comparative Example 2, which had been pre-heated to 290° C.

The pressure was then reduced to 1.3 mm Hg absolute and a nitrogen sweep was introduced by adjusting the nitrogen inlet valve until a pressure of 4 mm Hg was obtained corresponding to the flow rate of 0.13 scfm and a calculated average gas velocity of 13 ft/sec. The rotor speed was then set at 60 rpm. The processor was allowed to run for 30 minutes, after which time water was circulated through cooling passages in the housing of the processor to quench the molten processed material. Products of condensation (e.g., glycol, diethylene glycol, and water) were collected in a cold trap connected to the evacuated processor.

Polymeric product was collected from the processor and analyzed. The product was white and appeared to be free of color impurities based on visual inspection. The intrinsic viscosity of the product was determined to be 0.8475 dl/gm corresponding to a degree of polymerization of 122.45 units. The use of nitrogen sweep under vacuum was, therefore, found to significantly increase the polymerization rate in this example.

EXAMPLE 2 AND COMPARATIVE EXAMPLE 3

Figure 3A:
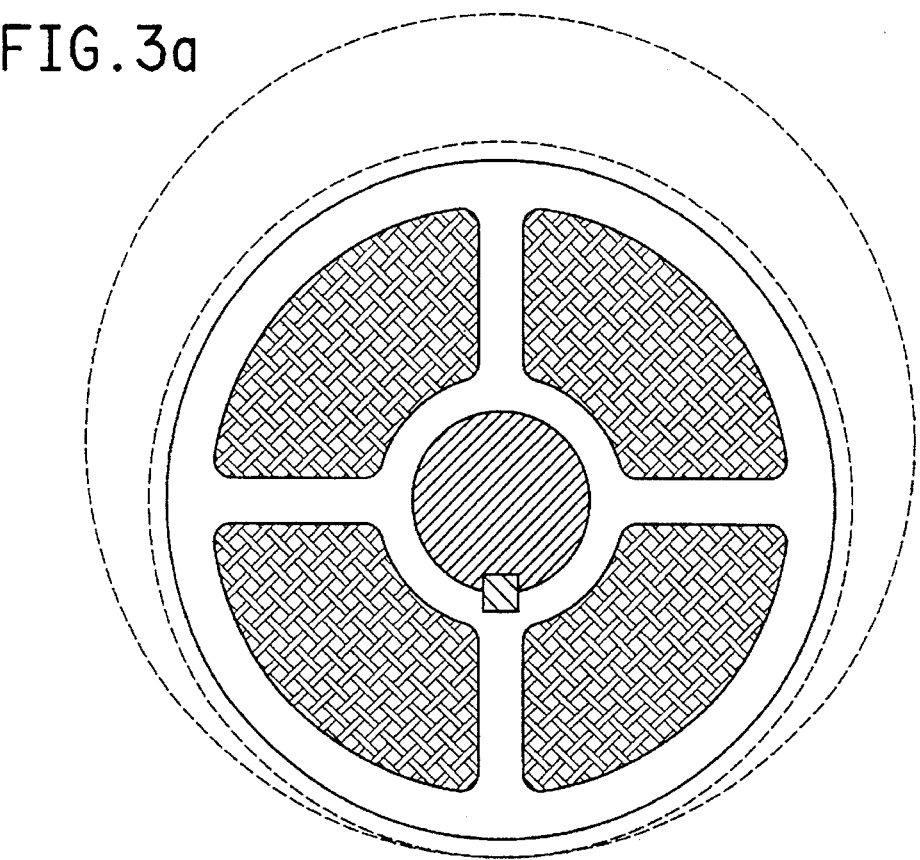
FIGS. 3a and 3b are respectively a longitudinal and a cross section of the screen type rotor used in Example 2 and Comparative Example 3.
Figure 3B:
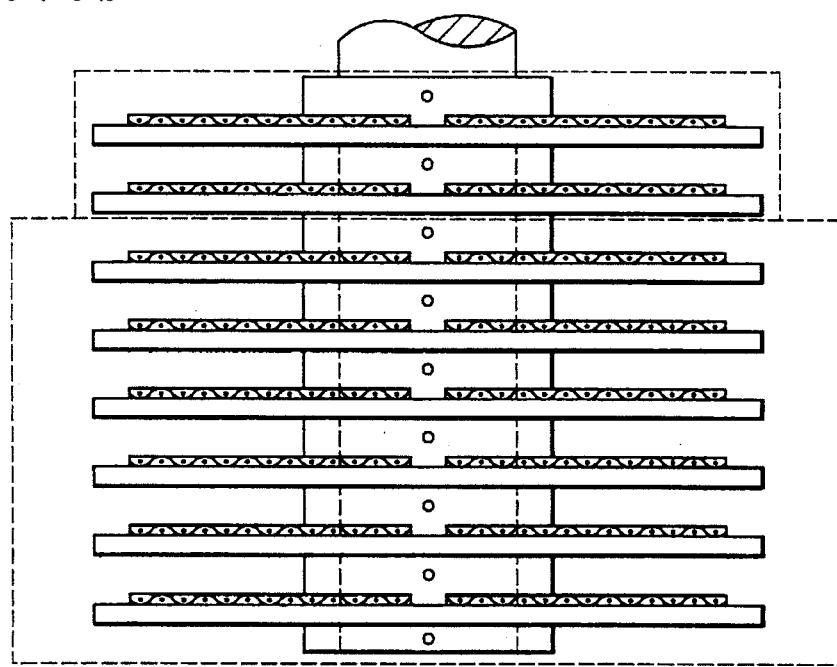

In the following examples a prepolymer feed material with an intrinsic viscosity of 0.218 dl/g, made in substantially the same manner as that of Comparative Example 1, was dried as therein described and fed in the same manner as in Comparative Example 2 to the pre-heated apparatus of Comparative Example 2 which had been modified by replacing the perforated drum with a screen-type replacement rotor to emulate operation of a conventional finisher. The rotor is shown in FIGS. 3a and 3b. FIG. 3a shows a stack of screens on a rotatble shaft. FIG. 3b shows a front view of one of the screens.

Using the screen-type rotor and a vacuum of 1.3 mm Hg abs.the prepolymer feedstock was polymerized to an I.V. of 0.676 in 90 minutes. With identical feedstock and operating conditions, polymerization under a sweep of rarefied nitrogen at 4 mm Hg abs.resulted in an I.V. of 1.045 in the same period of time.

EXAMPLES 3–8 AND COMPARATIVE EXAMPLES 4–7

In these Examples 55 g charges of a PET prepolymer prepared in the manner of that in Comparative Example 1, having an intrinsic viscosity of 0.2756 dl/g, was fed into the apparatus of Comparative Example 2 in the manner therein described, the apparatus having been pre-heated to 290° C. The process was then run as described in Comparative Example 2 for a period of 30 min., the conditions of inert gas flow and applied vacuum being those described in the table following. The resulting increase in molecular weight, as indicated by the change in intrinsic viscosity is also shown in the table for each experimental condition.

EXAMPLES 3–8 AND COMPARATIVE EXAMPLES 4–7

|  | Gauge Pressure (mm Hg Abs) | Gas | Volumetric Flow Rate (cfm) | Final I.V. (dl/gm) (Goodyear) |
| --- | --- | --- | --- | --- |
| Example 3 | 4 | N2 | 25 | 0.7393 |
| Comparative Example 4 | 1 | None | NA | 0.5892 |
| Example 4 | 4 | Ar | 25 | 0.775 |
| Example 5 | 4 | He | 25 | 0.7611 |
| Comparative Example 5 | ca. 760 | N2 | 0.13 | 0.6493 |
| Example 6 | 4 | N2 | 25 | 0.768 |
| Comparative | 1.3 | None | NA | 0.5349 |

-continued

|  | Gauge Pressure (mm Hg Abs) | Gas | Volumetric Flow Rate (cfm) | Final I.V. (dl/gm) (Goodyear) |
| --- | --- | --- | --- | --- |
| Example 6 |  |  |  |  |
| Example 7 | 4 | Ar | 25 | 0.7384 |
| Example 8 | 4 | He | 25 | 0.7621 |
| Comparative Example 7 | ca. 760 | N2 | 0.13 | 0.6884 |

What is claimed is:

1. A process for increasing the molecular weight of condensation polymers, the process comprising introducing a low molecular weight starting material to a reactor vessel, the vessel being equipped with a means for heating the material and further being equipped with a means for stirring the material, the vessel being further equipped with a means for introducing an inert gas, the vessel being further equipped with a means for removing the inert gas, the vessel being further equipped with a means for applying vacuum to the material while it is being stirred;

heating the vessel either before, during, or after the introduction of the material, to a temperature at which a polycondensation reaction will proceed;

stirring the material during the polycondensation reaction; during the polycondensation reaction, causing an inert gas to flow through the vessel over the surface of the material, the inert gas being at a pressure of no greater than 100 torr, and the rate of flow of the inert gas being from 10 to 100 ft./sec.; and removing the material when the molecular weight has undergone a desired increase.

2. The process of claim 1 wherein the rate of flow of the inert gas is from 10 to 50 ft./sec.

3. The process of claim 1 wherein the polymer product is a polyester or polyamide.

4. The process of claim 1 wherein the process is continuous.

5. The process of claim 4 wherein the process is conducted in a melt phase.

6. The process of claim 3 wherein the product is a polyester.

7. The process of claim 6 wherein the polyester product is poly(ethylene terephthalate).

8. The process of claim 5 wherein the melt is continuously mixed.

* * * * *